US009550166B2

(12) United States Patent
Lee et al.

(10) Patent No.: US 9,550,166 B2
(45) Date of Patent: Jan. 24, 2017

(54) STRONTIUM COBALTITE OXYGEN SPONGE CATALYST AND METHODS OF USE

(71) Applicant: UT-Battelle, LLC, Oak Ridge, TN (US)

(72) Inventors: Ho Nyung Lee, Oak Ridge, TN (US); Hyoungjeen Jeen, Knoxville, TN (US); Woo Seok Choi, Gyeonggido (KR); Michael Biegalski, Oak Ridge, TN (US); Chad M. Folkman, San Jose, CA (US); I-Cheng Tung, Chicago, IL (US); Dillon D. Fong, Elmhurst, IL (US); John W. Freeland, Oak Park, IL (US); Dongwon Shin, Knoxville (KR); Hiromichi Ohta, Sapporo (JP); Matthew F. Chisholm, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 493 days.

(21) Appl. No.: 14/090,120

(22) Filed: Nov. 26, 2013

(65) Prior Publication Data

US 2015/0148218 A1    May 28, 2015

(51) Int. Cl.
*B01J 23/58* (2006.01)
*B01J 20/04* (2006.01)
(Continued)

(52) U.S. Cl.
CPC .............. *B01J 20/04* (2013.01); *B01J 23/78* (2013.01); *B01J 23/847* (2013.01); *C01G 51/66* (2013.01);
(Continued)

(58) Field of Classification Search
CPC .......... B01J 20/04; B01J 23/847; B01J 23/78; B01J 35/0033; B01J 37/349; B01J 23/002; C01G 51/66; C01P 2002/72; C01P 2006/42; C01P 2002/77
(Continued)

(56) References Cited

U.S. PATENT DOCUMENTS

| 5,876,866 A | 3/1999 | McKee et al. |
| 6,896,992 B2 | 5/2005 | Kearl |
| 7,914,941 B2 | 3/2011 | Inagaki et al. |

OTHER PUBLICATIONS

Tobias Gulden "Epitaxial Growth of Thin Film Strontium Cobaltite: A Feasibility Study" Jun. 2012, Retrieved from the University of Minnesota Digital Conservancy, http://purl.umn.edu/131474.*

(Continued)

*Primary Examiner* — Colleen Dunn
*Assistant Examiner* — Haytham Soliman
(74) *Attorney, Agent, or Firm* — Warner Norcross & Judd LLP

(57) ABSTRACT

Rapid, reversible redox activity may be accomplished at significantly reduced temperatures, as low as about 200° C., from epitaxially stabilized, oxygen vacancy ordered $SrCoO_{2.5}$ and thermodynamically unfavorable perovskite $SrCoO_{3-\delta}$. The fast, low temperature redox activity in $SrCoO_{3-\delta}$ may be attributed to a small Gibbs free energy difference between the two topotactic phases. Epitaxially stabilized thin films of strontium cobaltite provide a catalyst adapted to rapidly transition between oxidation states at substantially low temperatures. Methods of transitioning a strontium cobaltite catalyst from a first oxidation state to a second oxidation state are described.

18 Claims, 8 Drawing Sheets

(51) Int. Cl.
- C01G 51/00 (2006.01)
- B01J 23/78 (2006.01)
- B01J 23/847 (2006.01)
- B01J 37/34 (2006.01)
- B01J 23/00 (2006.01)
- B01J 35/00 (2006.01)

(52) U.S. Cl.
CPC ........... B01J 23/002 (2013.01); B01J 35/0033 (2013.01); B01J 37/349 (2013.01); C01P 2002/72 (2013.01); C01P 2002/77 (2013.01); C01P 2006/42 (2013.01)

(58) Field of Classification Search
USPC ......................................................... 502/328
See application file for complete search history.

(56) References Cited

OTHER PUBLICATIONS

Pena, M.A. et al, Chemical Structures and Performance of Perovskite Oxides, Chem. Rev. 2001, 101, 1981-2017.
Maier, J., Nanoionics: ion transport and electrochemical storage in confined systems, Nature Materials, vol. 4, Nov. 2005, www.nature.com/naturematerials, 805-815.
Norskov, J.K., et al, Towards the computational design of solid catalysts, Nature Chemistry, vol. 1, Apr. 2009, www.nature.com/naturechemistry, 37-46.
Kawada, Tatsuya, Chapter 7, Perovskite Oxide for Cathode of SOFCs, 2009, 147-166.
Shao, Zongping, et al, A high-performance cathode for the next generation of solid-oxide fuel cells, Nature, vol. 431, Sep. 9, 2004, www.nature.com/nature, 170-173.
Poeppelmeier, K.R., et al, CaMnO2.5 and Ca2MnO3.5: New Oxygen-Defect Perovskite-Type Oxides, Journal of Solid State Chemistry 44, 89-98 (1982).
Haywood, M.A., et al, The Hydride Anion in an Extended Transition Metal Oxide Array: LaSrCoO3H0.7, Science 295, Mar. 8, 2002, 1882-1884, downloaded from www.sciencemag.org on May 9, 2012.
Inoue, Satoru, et al, Anisotropic oxygen diffusion at low temperature in perovskite-structure iron oxides, Nature Chemistry, vol. 2, Mar. 2010, www.nature.com/naturechemistry, 213-217.
Long, Youwen, et al, Synthesis of cubic SrCoO3 single crystal and its anisotropic magnetic and transport properties, J. Phys.: Condens. Matter 23 (2011) 245601, 1-6, downloaded from www.iopscience.iop.org/0953-8984/23/24/245601 on Jul. 3, 2012.
Takeda, Takayoshi, et al, Magnetic Structure of SrCoO2.5, Journal of the Physical Society of Japan, vol. 33, No. 4, Oct. 1972, 970-972.
Bezdicka, P., et al, Preparation and Characterization of Fuly Stoichiometric SrCoO3 by Electrochemical Oxidation, Z. anorg. allg. Chem, 619 (1993) 7-12.
Toquin, Ronan Le, et al, Time-Resolved in Situ Studies of Oxygen Intercalation into SrCoO2.5, Performed by Neutron Diffraction and X-ray Absorption Spectroscopy, J. Am. Chem. Soc. 2006, vol. 128, No. 40, 13161-13174.
Nemudry, A., et al, Topotactic Electrochemical Redox Reactions of the Defect Perovskite SrCoO2.5+x, Chem Mater. 1996, vol. 8, No. 9, 2232-2238.
Taguchi, H., et al, the Effect of Oxygen Vacancy on the Magnetic Properties in the System SrCoO3-6 (0<0<0.5), Journal of Solid State Chemistry 29, 221-225 (1979).
Pasierb, P., et al, Comparison of the chemical diffusion of undoped and Nb-doped SrTiO3, Journal of Physics and Chemistry of Solids 60 (1999) 1835-1844.
Goodenough, et al, 3 Crystallographic and magnetic properties of perovskite and perovskite-related compounds*), 1970 Landolt Bornstein, 126-262.
Mizusaki, Junichiro, et al, Nonstoichiometry of the Perovskite-Type Oxide La1-xSrxCrO3-8, Solid State Ionics 12 (1984) 119-124, North-Holland, Amsterdam.
Hayashi, Naoaki, et al, Oxygen-holes creating different electronic phases in Fe4+-oxides: successful growth of single crystalline films of SrFeO3 and related perovskites at low oxygen pressure, J. Mater. Chem., 2001, 11, 2235-2237.
Munoz, A., et al, Crystallographic and magnetic structure of SrCoO2.5 brownmillerite: Neutron study coupled with band-structure calculations, Physical Review B78, 065505 (2008), 054404-1-054404-8.
Stemmer, S., et al, Characterization of oxygen-deficient SrCoO3-8 by electron energy-loss spectroscopy and Z-contrast imaging, Solid State Ionics 130 (2000) 71-80.
Sammells, Anthony F., et al, Rational selection of advanced solid electrolytes for intermediate temperature fuel cells, Solid State Ionics 52 (1992) 111-123, North-Holland.
Senaris-Rodriquez, M.A., et al, Magnetic and Transport Properties of the System, La1-xSRxCoO3-8(0<x<0.50), Journal of Solid State Chemistry 118, 323-336 (1995).
Wu, J., et al, Glassy ferromagnetism and magnetic phase separation in La1-xSrxCoO3, Physical Review B 67, 174408 (2003), 174408-1-174408-16.
Suntivich, Jin, et al, Design principles for oxygen-reduction activity on perovskite oxide catalysts for fuel cells and metal-air batteries, Nature Chemistry, vol. 3, Jul. 2011, www.nature.com/naturechemistry, 546-550.
Imada, Masatoshi, et al, Metal-insulator transitions, Reviews of Modern Physics, vol. 70, No. 4, Oct. 1998, 1039-1263.
Moodenbaugh, A.R., et al, Hole-state density of La1-xSrxCoO3-8(0<x<0.5) across the insulator/metal phase boundary, Physical Review B, vol. 61. No. 8, Feb. 15, 2000, 5666-5671.
Karvonen, Lassi, et al, O—K and Co—L XANES Study on Oxygen Intercalation in Perovskite SrCoO3-8, Chem. Mater. 2010, vol. 22, No. 1, 70-76.
Xie, C.K., et al, Magnetic phase separation in SrCoOx(2.5<x<3), Applied Physics Letters 99, 052503 (2011), 052503-1-052503-3.
Balamurugan, S., et al, Specific-heat evidence of strong electron correlations and thermoelectric properties of the ferromagnetic perovskite SrCoO3-8, Physical Review B 74, 172406 (2006), 172406-1-172406-4.
Ichikawa, Noriya, et al, Reduction and oxidation of SrCoO2.5 thin films at low temperatures, The Royal Society of Chemistry 2012, Salton Trans., downloaded on May 15, 2012, www.pubs.rec.org/doi:10.1039/C2DT30317E.
Lee, Jun Hee, et al, Coupled Magnetic-Ferroelectric Metal-Insulator Transition in Epitaxially Strained SrCoO3 from First Principles, Physical Review Letters, 107, 067601 (2011), 067601-1-067601-4.
Potze, R.H., et al, Possibility for an intermediate-spin ground state in the charge-transfer material SrCoO3, Physical Review B, vol. 51, No. 17, May 1, 1995—I, 11 501-11 506.
Maignam, A., et al, A new form of oxygen deficient 1201-cobaltite (TI0.4SR0.5Co0.1)Sr2CoO5-8: structure, transport and magnetic properties, J. Mater. Chem., 2002, 12, 1009-1016.
Zeng, Pingying, et al, Efficient stabilization of cubic perovskite SrCoO3-8 by B-site low concentration scandium doping combined with sol-gel synthesis, Journal of Alloys and Compounds 455 (2008) 465-470.
Tsujimoto, Y., et al, Infinite-layer iron oxide with a square-planar coordination, vol. 450, Dec. 13, 2007, doi:10.1038/nature06382, 1062-1065.
Saal, James E., Thermodynamic Modeling of Phase Transformations and Defects: From Cobalt to Doped Cobaltate Perovskites, The Pennsylvania State University, The Graduate School, A Dissertation in Materials Science and Engineering, Dec. 2010, pp. 268.
Voorhoeve, R.J.H., Chapter 5: Perovskite-Related Oxides as Oxidation-Reduction Catalysts, Advanced Materials in Catalysts, Academic Press, Inc. (London) Ltd., 1977, 129-180.

* cited by examiner

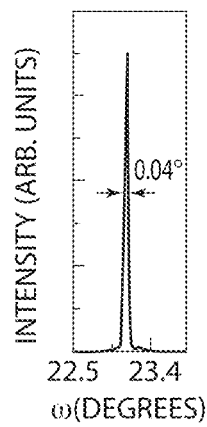
Fig. 4A
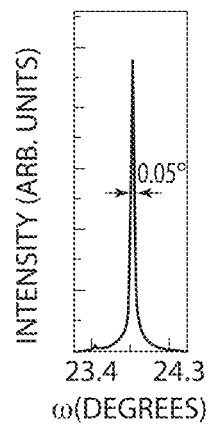
Fig. 4B
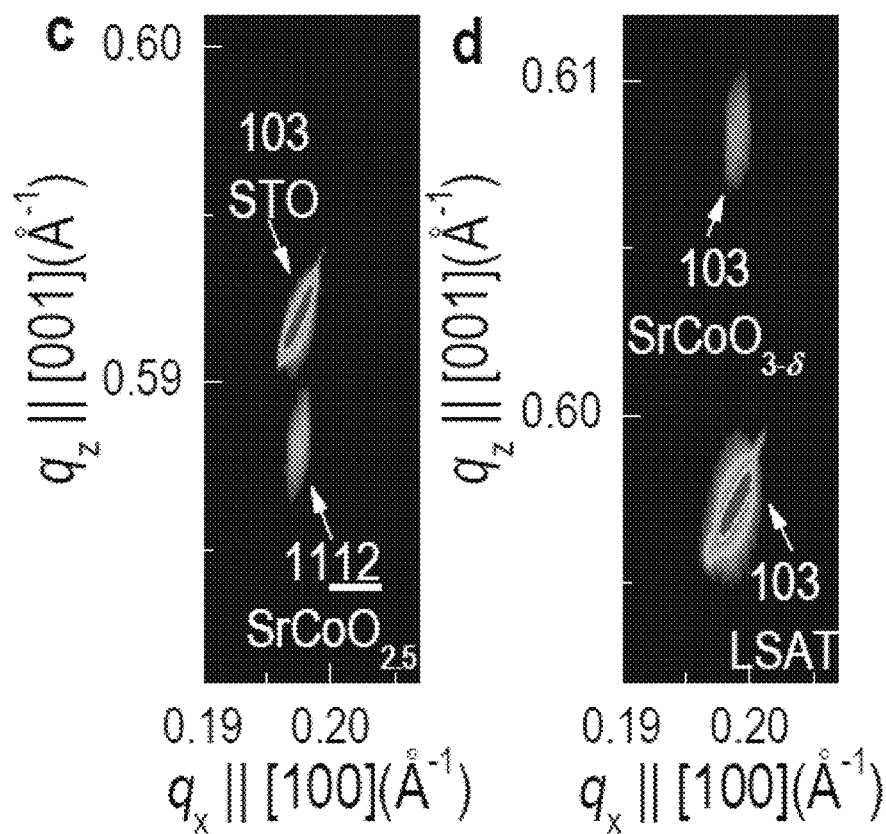
Fig. 4C
Fig. 4D

US 9,550,166 B2

STRONTIUM COBALTITE OXYGEN SPONGE CATALYST AND METHODS OF USE

This invention was made with government support under Contract No. DE-AC05- 000R22725 awarded by the U.S. Department of Energy. The government has certain rights in the invention.

BACKGROUND OF THE INVENTION

The present invention relates to oxidation-reduction catalysts that include strontium cobaltite materials.

Transition-metal oxides (TMOs) have been studied for energy technologies because of their physical properties. In particular, owing to the ionic and electronic conductivity offered from the flexibility of transition metal's charge states, multi-valent TMOs have attracted attention for potential applications as catalysts.

Many energy storage and sensor devices rely on atoms that are convertible from one valence state to another. For example, catalytic gas converters use platinum-based metals to transform harmful emissions such as carbon monoxide into nontoxic gases by adding oxygen. Less expensive oxide-based alternatives to platinum usually require very high temperatures, at least 600-700° C., to trigger the redox reaction, making such materials impractical in conventional applications.

SUMMARY OF THE INVENTION

The present invention provides an epitaxially stabilized strontium cobaltite catalyst adapted to rapidly transition between oxidation states at substantially low temperatures.

In one embodiment there is provided an article having a thin film of the epitaxially stabilized strontium cobaltite catalyst.

In one embodiment there is provided a method of transitioning a strontium cobaltite catalyst from a first oxidation state to a second oxidation state comprising the steps of: providing a substrate supporting at least a thin film or layer of the catalyst in the first oxidation state, elevating the temperature of the catalyst, and providing a vacuum atmosphere to the catalyst in the first oxidation state. The temperature is elevated to within a range of 210° C. to 320° C. for a first period of time to effect the transition of the catalyst to the second oxidation state.

Further, the method may provide the steps of reversing the transitioning of the catalyst from the first oxidation state to the second oxidation state by transitioning the catalyst from the second oxidation state to the first oxidation state by: elevating the temperature of the catalyst in the second oxidation state and providing oxygen for a second period of time, wherein the second period of time is sufficient to effect the transition of the catalyst to the first oxidation state.

In one embodiment there is provided an epitaxially stabilized thin film of strontium cobaltite adapted to transition between $SrCoO_{2.5}$ and $SrCoO_{3-\delta}$ phases.

In a further embodiment, the film of strontium cobaltite is stabilized on a substrate selected from perovskite ($ABO_3$, A: alkaline or alkaline earth element, B: transition metal, and O: oxygen group including $SrTiO_3$, and $(LaAlO_3)_{0.3}$-$(Sr_2AlTaO_6)_{0.7}$.

These and other objects, advantages, and features of the invention will be more fully understood and appreciated by reference to the description of the current embodiment and the drawings.

BRIEF DESCRIPTION OF THE DRAWINGS

FIG. 4A is an x-ray rocking curve scan of the brownmillerite phase of strontium cobaltite;

FIG. 4B is an x-ray rocking curve scan of the perovskite phase of strontium cobaltite;

FIG. 4C is a reciprocal space map of $SrCoO_{2.5}$ on STO substrate;

FIG. 4D is a reciprocal space map of $SrCoO_{3-\delta}$ on LSAT substrate;

Figure 1:
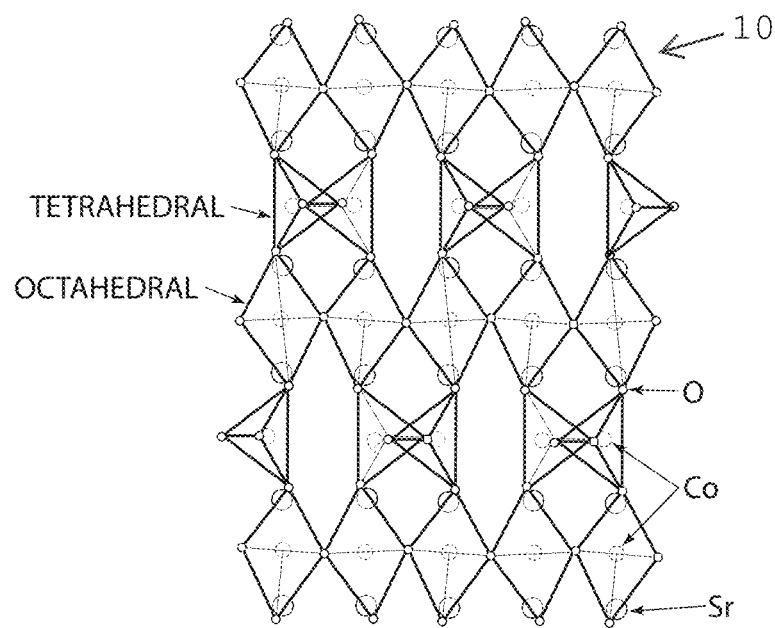
FIG. 1 is a schematic depiction of a strontium cobaltite thin film in the brownmillerite phase.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and is capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

Figure 2:
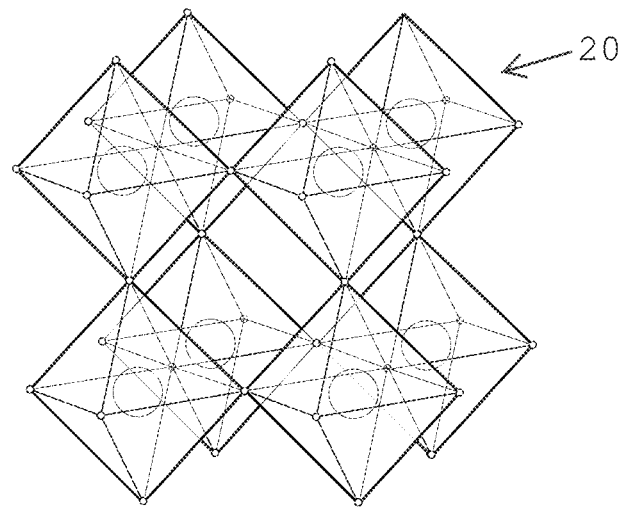
FIG. 2 is a schematic depiction of a strontium cobaltite thin film in the perovskite phase.

A catalyst in accordance with an embodiment of the invention is shown in FIGS. 1-2 and is generally designated 10 and 20, respectively. The catalyst 10 is shown in FIG. 1 as a strontium cobaltite ($SrCoO_{2.5}$) thin film in a brownmillerite phase. $SrCoO_{2.5}$ is orthorhombic ($a_o$=5.5739), $b_o$=5.4697, and $c_o$=15.745 angstrom (Å)), which can be represented as pseudo-tetragonal ($a_t$=3.905 and $c_t/4$=3.9363 Å). The catalyst 20 is shown in FIG. 2 as strontium cobaltite ($SrCoO_{3-\delta}$) thin film in a perovskite phase. $SrCoO_{3-\delta}$ is cubic with $a_c$=3.8289 Å. Thin films of $SrCoO_{2.5}$ and $SrCoO_{3-\delta}$ may be grown epitaxially, for example by use of pulsed laser epitaxy on a variety of substrates. Examples of such substrates include, but are not limited to, perovskite ($ABO_3$: where A is an alkaline or alkaline earth element, B is a transition metal and O is oxygen), $SrTiO_3$, herein "STO" and $(LaAlO3)_{0.3}$-$(Sr_2AlTaO_6)_{0.7}$, herein "LSAT". Thermo-mechanical degradation reduces the overall performance and lifetime of many perovskite oxides undergoing reversible redox reactions, such as those found in solid oxide fuel cells, rechargeable batteries, electrochemical sensors, oxygen membranes and catalytic converters. To mitigate this degradation, these reactions must occur at lower temperatures. However, high temperatures (>700° C.) are often required in conventional perovskites for fast catalysis and bulk diffusion. The strontium cobaltite oxygen sponge described herein can easily absorb and shed oxygen at as low a temperature as 200° C., which has been confirmed by switching between the crystalline phases of perovskite $SrCoO_{3-\delta}$ and brownmillerite $SrCoO_{2.5}$.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

Figure 3A:
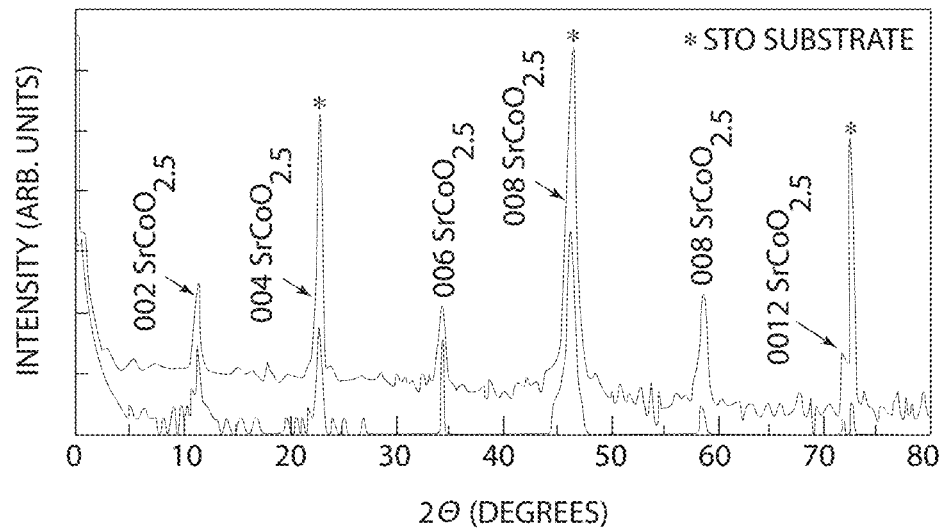
FIG. 3A is an x-ray diffraction scan pattern of brownmillerite-type $SrCoO_{2.5}$.
Figure 3B:
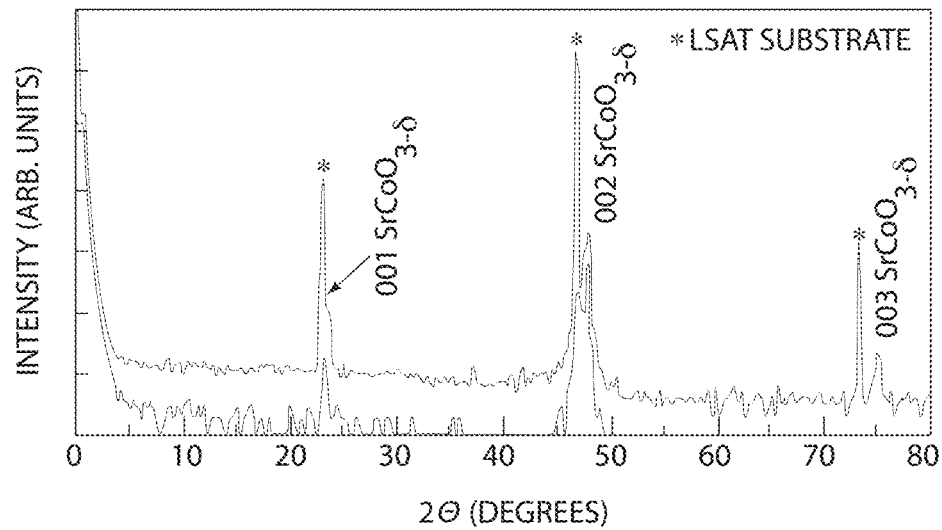
FIG. 3B is an x-ray diffraction scan pattern of perovskite-type $SrCoO_{3-\delta}$.

Referring to FIG. 3A, an x-ray diffraction (XRD) θ-2θ scan pattern of a brownmillerite-type $SrCoO_{2.5}$ thin film grown on an STO substrate is shown. In FIG. 3B is shown an XRD θ-2θ scan pattern for perovskite-type $SrCoO_{3-\delta}$ thin film grown on an LSAT substrate. While both phases may be grown epitaxially on either substrate STO ($a_c$=3.905 Å) and LSAT ($a_c$=3.868 Å), lower or fewer lattice mismatches are obtained when $SrCoO_{2.5}$ films are grown on an STO substrate and when $SrCoO_{3-\delta}$ films are grown on an LSAT substrate. The brownmillerite phase thin film may be readily stabilized in a simple molecular oxygen atmosphere while the perovskite phase thin film may require epitaxial stabilization in a more oxidizing atmosphere, for example, with the addition of mixed gases of ozone and oxygen.

Epitaxial $SrCoO_{2.5}$ and $SrCoO_{3-\delta}$ thin films (40-60 nm in thickness) were grown on (001) STO and (001) LSAT substrates by pulsed laser epitaxy (KrF, λ=248 nm). The films were grown at 750° C. in 0.013 mbar of $O_2$ for the $SrCoO_{2.5}$ and 0.267 mbar of $O_2+O_3$ (5%) for the $SrCoO_{3-\delta}$. The laser fluence was fixed at 1.7 J/cm². The sample structure and crystallinity were characterized by high-resolution four-circle XRD (X'Pert, Panalytical Inc.). The Z-contrast images were obtained using a Nion Ultra STEM 200 operated at 200 keV.

FIGS. 3A and 3B reveal well defined peaks and distinct thickness fringes, which demonstrate the chemically sharp interface and flat surface. X-ray rocking curve scans further confirm excellent crystallinity (Δω<0.05°) and reciprocal space mapping confirmed that both films were coherently strained on the substrate as shown. See FIGS. 4A through 4D. These rocking curves are from the 008 Bragg peak of $SrCoO_{2.5}$ and the 002 Bragg peak of $SrCoO_{3-\delta}$. The curves reveal full width at half maxima (FWHM) of 0.04° and 0.05°, respectively. Typical FWHM in ω scan of the 002 STO peak is ~0.015°, emphasizing the superior crystallinity confirmed by this analysis. Due to a larger mismatch between $SrCoO_{3-\delta}$ and STO, the crystallinity of $SrCoO_{3-\delta}$ is poorer than that of $SrCoO_{3-\delta}$ on LSAT. In particular, the brownmillerite phase of strontium cobaltite exhibits a doubling of the c-axis lattice constant originating from the alternate stacking of octahedral and tetrahedral sub-layers along the c-axis (as shown in FIG. 1). FIGS. 4C and 4D are reciprocal space maps ("RSMs") around the 103 STO with $SrCoO_{2.5}$ (FIG. 4C) and $SrCoO_{3-\delta}$ around 103 LSAT reflection (FIG. 4D). The in-plane lattice constants of both $SrCoO_{2.5}$ and $SrCoO_{3-\delta}$ films were coherently matched to those of the substrates. In addition, the c lattice constants from the RSMs were consistent with those measured from the θ-2θ scans, i.e. c/2=3.93 Å for $SrCoO_{2.5}$ and c=3.79 Å for $SrCoO_{3-\delta}$, The c-axis lattice constant of $SrCoO_{3-\delta}$ was smaller than the bulk value due to the substrate induced tensile strain.

Figure 5A:
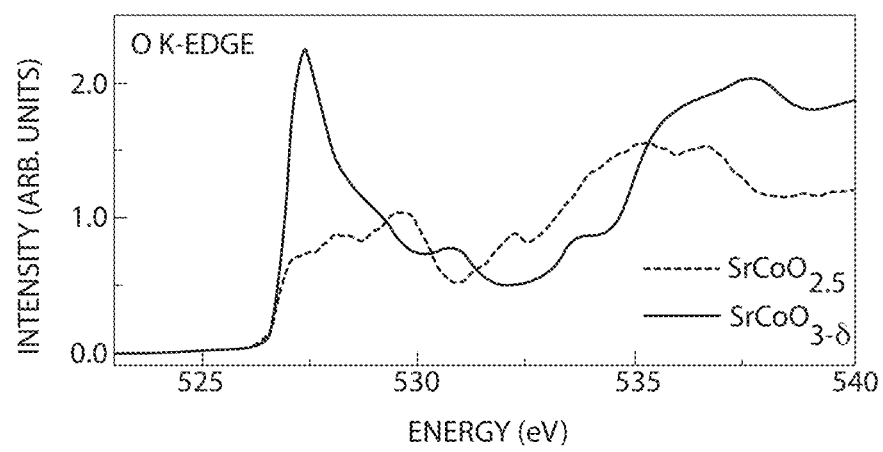
FIG. 5A is a polarized x-ray absorption spectroscopy (XAS) graph of the oxygen K-edge peaks for two phases of strontium cobaltite.
Figure 5B:
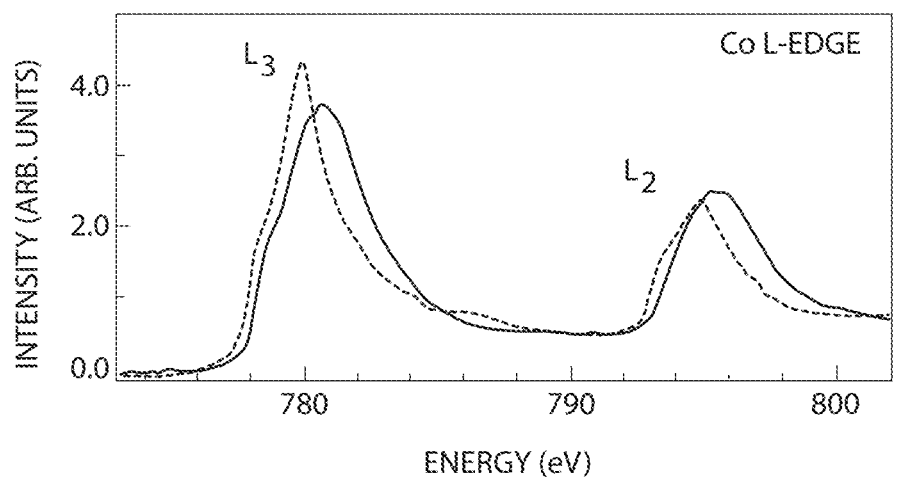
FIG. 5B is a polarized x-ray absorption spectroscopy (XAS) graph of the cobalt L-edge peaks for two phases of strontium cobaltite.

Confirmation of the two chemically distinct phases was provided by observing the details of the cobalt valence state of epitaxial $SrCoO_{2.5}$ and $SrCoO_{3-\delta}$ thin films by polarized x-ray absorption spectroscopy (XAS). This technique provides information on the oxidation state of cobalt which plays a deterministic role in the magnetic, electronic and catalytic properties of the materials. Oxygen stoichiometry in the $SrCoO_{2.5}$ and $SrCoO_{3-\delta}$ thin films were qualitatively characterized by monitoring the oxygen K-edge peaks as shown in FIG. 5A. The peak of $SrCoO_{3-\delta}$ (solid line) at ~527 eV clearly indicates different oxygen content as compared to $SrCoO_{2.5}$. It may be expected that the pre-peak intensity of oxygen K-edge decreases as δ approaches 0.5 in polycrystalline $SrCoO_{3-\delta}$. The weaker pre-peak may provide evidence that the $SrCoO_{2.5}$ films were grown with the robust $Co^{+3}$ valence state. The oxygen K-edge pre-peak for the $SrCoO_{3-\delta}$ film shows higher intensity compared to that for polycrystalline $SrCoO_{2.82}$, which corresponds to the largest oxidation state reported in the literature, indicating that the analyzed $SrCoO_{3-\delta}$ films are highly oxidized with a δ<0.18. Moreover, cobalt L-edge spectra may provide a rigorous determination of the cobalt valence state by measuring the empty cobalt 3d electronic state directly as shown in FIG. 5B (where data for $SrCoO_{3-\delta}$ is shown by a solid line and data for $SrCoO_{2.5}$ is shown by a dashed line). The shift in $L_3$-edge toward the higher energy (>0.7 eV) in $SrCoO_{3-\delta}$ indicates the cobalt ions in $SrCoO_{3-\delta}$ are in a higher valence state. Together with the clear metallic behavior shown in FIG. 6C, discussed herein below, and the shift of the cobalt $L_2$-edge peak from bulk $SrCoO_{2.88}$, the highly oxygenated state of $SrCoO_{3-\delta}$ is determined to be about δ<0.1. Such highly oxygenated crystalline strontium cobaltite has not been grown previously without post treatment.

Figure 5C:
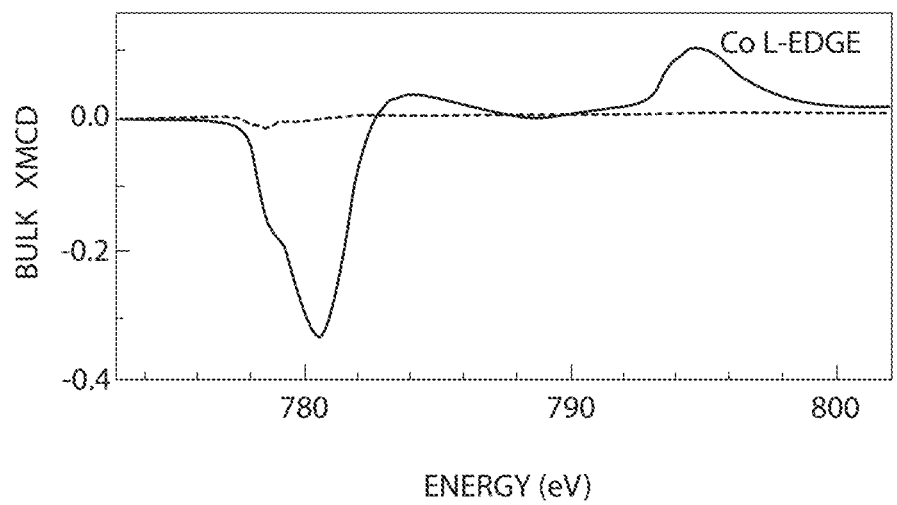
FIG. 5C is an x-ray magnetic circular dichroism ("XMCD") spectra of two phases of strontium cobaltite.
Figure 6A:
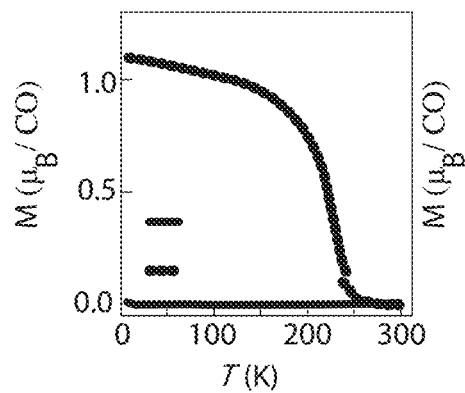
FIG. 6A is a graphical representation of the dependent magnetization of two phases of strontium cobaltite.
Figure 6B:
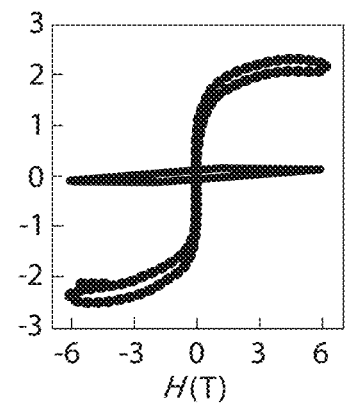
FIG. 6B is a graph of magnetic hysteresis loops for two phases of strontium cobaltite.

The distinct chemical valence difference between the $SrCoO_{2.5}$ and $SrCoO_{3-\delta}$ phases produced distinct magnetic and electric properties. Element-resolved measurements of the net magnetic moment using x-ray magnetic circular dichroism (XMCD) showed a large ferromagnetic signal in the $SrCoO_{3-\delta}$ film, see FIG. 5C. The ferromagnetic state was further supported by the field-dependent XMCD data revealing that about 70% of the XMCD signal at 5 T was retained at 0.1 T. On the other hand, $SrCoO_{2.5}$ displayed much less an XMCD signal even at 5 T, implying $SrCoO_{2.5}$ is at a ferromagnetic ground state. As shown in FIGS. 6A and 6B, the magnetization measurement confirmed the XMCD results ($SrCoO_{2.5}$ is represented by the solid lines and $SrCoO_{3-\delta}$ is represented by the dotted lines). FIG. 6A represents the temperature dependent magnetization of $SrCoO_{2.5}$ and $SrCoO_{3-\delta}$ thin films at 1000 Oe. The $SrCoO_{3-\delta}$ epitaxial film is ferromagnetic below ~250K. The Curie temperature (Tc) is slightly lower than that from a single crystalline bulk $SrCoO_3$ (~305K). The lower Tc may be due to the substrate induced tensile strain. FIG. 6B shows the hysteresis loops for both $SrCoO_{2.5}$ and $SrCoO_{3-\delta}$ at 10K. The saturation magnetism of ($M_s$) of $SrCoO_{3-\delta}$ at 10K was ~2.3 $\mu_B$/Co, slightly smaller than the bulk value with an intermediate spin state that can be attributed to tensile strain as well. These results provide experimental confirmation of the theoretically predicted spin state in $SrCoO_{3-\delta}$. In contrast to $SrCoO_{3-\delta}$, no significant XMCD or SQUID signal was observed from the $SrCoO_{2.5}$ film. In addition, M(H) curves recorded at 10 and 250 K (data not shown) did not show a discernible difference, supporting the notion that the $SrCoO_{2.5}$ epitaxial films described herein are antiferromagnetic.

Figure 6C:
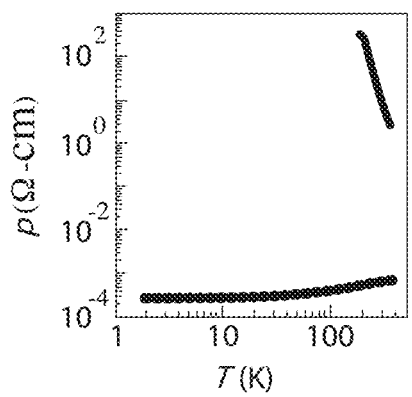
FIG. 6C is a graph of the resistivity of two phases of strontium cobaltite as a function of temperature.
Figure 6D:
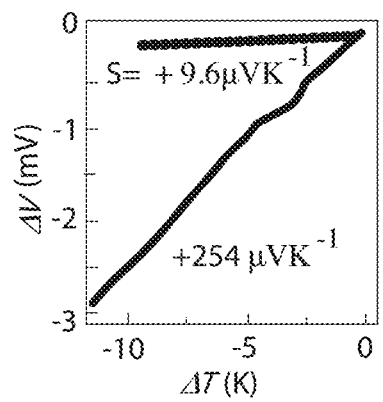
FIG. 6D is a graph of the thermoelectromotive force of two phases of strontium cobaltite at 300K.

There are also different electron transport properties between the two phases. Referring to FIG. 6C (where $SrCoO_{2.5}$ is represented by the solid lines and $SrCoO_{3-\delta}$ is represented by the dotted lines) there is shown a difference of more than four orders of magnitude in the resistivity between $SrCoO_{2.5}$ and $SrCoO_{3-\delta}$ at room temperature. An observation of metallic ground state in the epitaxial $SrCoO_{3-\delta}$ film described herein represents the successful stabilization of $Co^{+4}$ in the films, as the insulator-to-metal transition occurs at $\delta$~0.1. $SrCoO_{3-\delta}$ shows a lower resistivity than that of polycrystalline samples which may indicate minimal oxygen deficiency and high quality from direct epitaxy. In contrast, the $SrCoO_{2.5}$ film exhibited highly insulating properties. The calculated thermal activation energy of $SrCoO_{2.5}$ was about 0.19 eV, which is similar to the value expected for bulk samples (0.24 eV). The difference in transport measurement is also shown in thermopower value (S) which makes it possible to distinguish electronic ground state. The thermopower (S) reflects the electronic ground state, i.e. insulator or metal. A comparison of the S-value of $SrCoO_{2.5}$ with that of $SrCoO_{3-\delta}$ at room temperature, as shown in FIG. 6D, reveals an S-value of $SrCoO_{2.5}$ (S=+254 $\mu$V/K) that is significantly greater than that of $SrCoO_{3-\delta}$ (S=+9.6 $\mu$V/K) and confirms the insulating property of $SrCoO_{2.5}$. The observed S-values for both $SrCoO_{3-\delta}$ and $SrCoO_{2.5}$ are positive which indicates p-type conduction, consistent with bulk results. These results indicate the high sensitivity of electron transport properties as related to changes in the oxygen content of strontium cobaltite.

The valence (or oxidation) state and magnetism in SCO was elucidated by XAS and XMCD at beamline 4-ID-C of the Advanced Photon Source, Argonne National Laboratory. Magnetic property was characterized with a 7 T Superconducting Quantum Interference Device ("SQUID") magnetometer (Quantum Design). Temperature dependent DC transport measurements with van der Pauw geometry were performed with a 14 T Physical Property Measurement System (PPMS) (Quantum Design). The thermopower values were also measured by a conventional steady state method using two Peltier devices under the thin films to give a temperature difference ($\Delta$V~10K). Unlike the other measurements to eliminate the different substrate contributions during the thermopower measurements, both $SrCoO_{3-\delta}$ and $SrCoO_{2.5}$ films used were grown on (001) STO substrates.

Reversible redox reactions were monitored for a $SrCoO_{3-\delta}$ to $SrCoO_{2.5}$ conversion and $SrCoO_{2.5}$ to $SrCoO_{3-\delta}$ conversion. These reactions were observed by XRD, in which several parameters may be controlled, such as but not limited to, gas type, flow rate and pressure. During the $SrCoO_{3-\delta}$ to $SrCoO_{2.5}$ conversion a high-resolution four-circle XRD (X'Pert, Panalytical Inc.) with a domed hot stage (DHS 900, Anton Paar) was used. The inside of the dome was evacuated with a mechanical pump to a base pressure of 0.0013 mbar. For the $SrCoO_{2.5}$ to $SrCoO_{3-\delta}$ conversion, a power XRD with reactor chamber (XRK 900, Anton Paar) was used to pressurize the inside of the heating chamber to about 5 bar of $O_2$. The temperature ramping rate was between about 30-60° C. per minute with an average scan time of about 2 to 2.5 minutes. To demonstrate the phase reversal processes, real-time readings of temperature dependent XRD $\theta$-2$\theta$ scans with epitaxial films on LSAT in vacuum and with an oxygen atmosphere were recorded.

Figure 7A:
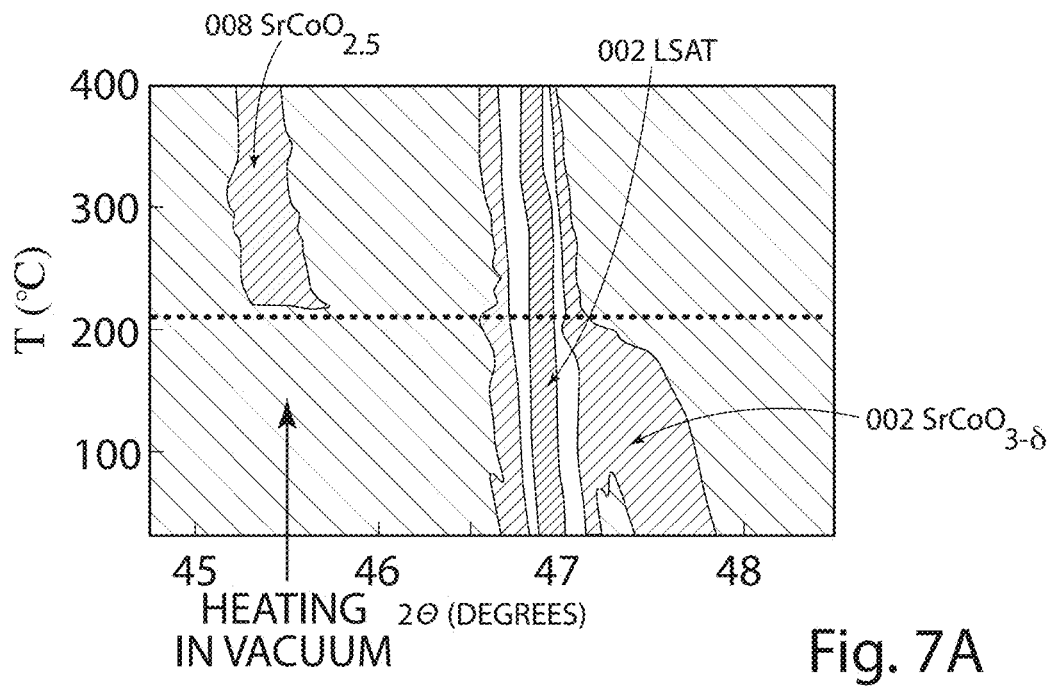
FIG. 7A depicts the phase transition of strontium cobaltite from the perovskite phase to the brownmillerite phase.
Figure 7B:
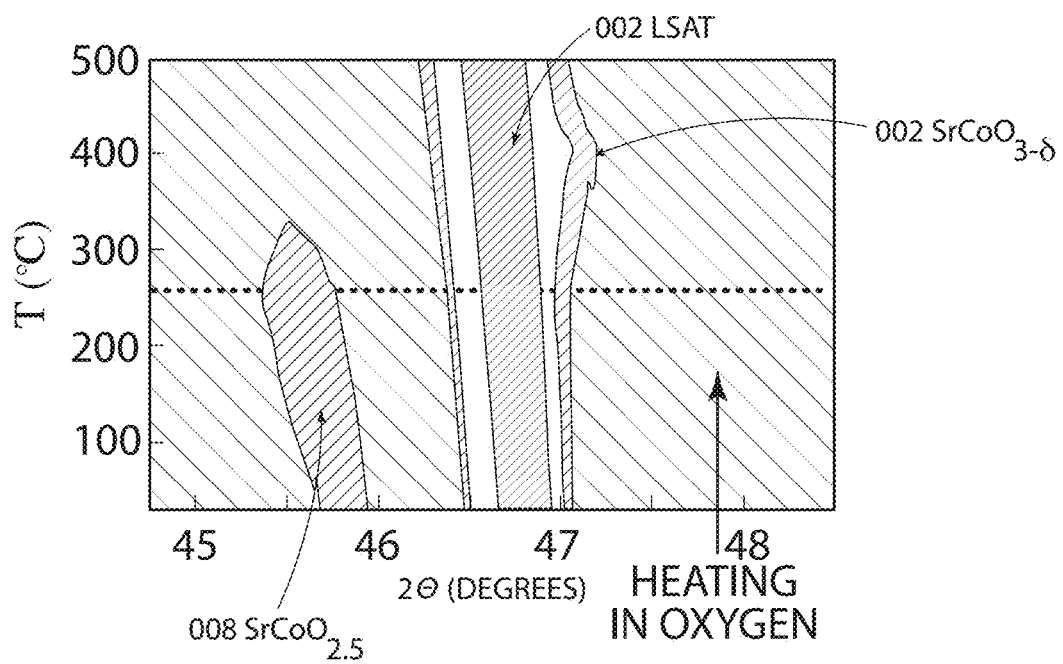
FIG. 7B depicts the phase transition of strontium cobaltite from the brownmillerite phase to the perovskite phase.

The ability to control the oxygen content in a material is significant for both physics and for technological application of multivalent oxides. Reversible oxidation-reduction ("redox") reactions were directly observed between the epitaxially stabilized perovskite and brownmillerite phases of strontium cobaltite without destruction or degradation of the parent material. Results of direct probing of reversible redox activity are shown in FIGS. 7A and 7B. Real time temperature dependent XRD $\theta$-2$\theta$ scans around the 002 LSAT reflection are shown. As shown in FIG. 7A, for the reduction process (i.e., $SrCoO_{3-\delta}$ to $SrCoO_{2.5}$), the 002 peak indicating the $SrCoO_{3-\delta}$ film begins to disappear at about 175° C., and a complete transition to $SrCoO_{2.5}$ is observed at about 210° C. The transition from one phase to another may be confirmed by the elongated c-axis lattice constant, as one can see in FIGS. 3A and 3B, due to the oxygen vacancy ordering. The resulting c-axis orientation, i.e. oxygen vacancy channels aligned parallel to the interface in the oxygen reduced film on LSAT can be understood by the lower mismatch (lattice mismatch =0.96%) as compared to the a-orientation (lattice mismatch =1.76%) with the vacancy channels aligned vertically.

For the oxidation process ($SrCoO_{2.5}$ to $SrCoO_{3-\delta}$), complete oxidation may be achieved at about 350° C. in 5 bar of $O_2$, as shown in FIG. 7B. In addition to the surprisingly low temperature for the topotactic phase transformation process (i.e., oxygen content change), the phase conversion was notably fast as the entire XRD scanning for the phase conversion took less than 10 minutes and is described herein above as between 2 and 2.5 minutes. Typically, conventional high pressure annealing processes at similar temperatures or by room temperature electrochemical approaches have taken >10 hours to complete. Moreover, the oxidation pressure is at least several hundred times lower than that of the annealing approach previously known. Phase conversion time and oxygen pressure for the epitaxial thin films were observed by the methods described herein as low as one minute and 0.67 bar, respectively. The lower limits of the pressure and temperature were determined by a step-by-step change of the post-annealing temperature subsequent to the growth of the thin film without breaking the vacuum.

Figure 8:
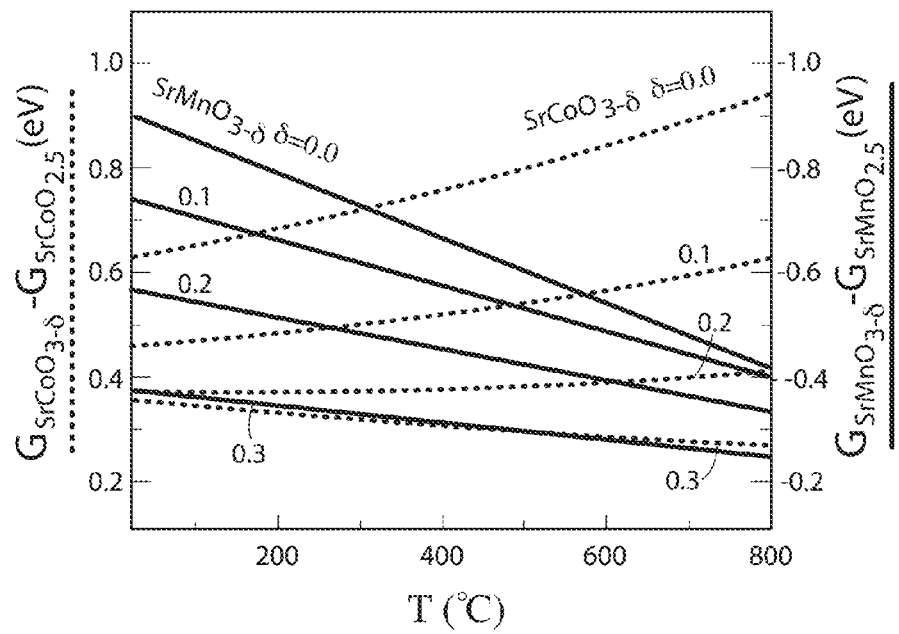
FIG. 8 is a graphical depiction of the energy differences between strontium cobaltite and strontium manganite with different oxygen contents.

The energy barrier for the phase transition of FIGS. 7A and 7B may be quantified by a computational thermodynamic approach. The calculated Gibbs free energy difference between the brownmillerite ($SrCoO_{2.5}$) and the perovskite ($SrCoO_{3-\delta}$) at different oxygen contents (0<$\delta$<0.3) as a function of temperature is represented in FIG. 8. Energy barriers of widely studied manganites, i.e. $SrMnO_x$ ("SMO"), which also forms $SrMnO_{2.5}$ and $SrMnO_{3-\delta}$ phases, were used for comparison. The overall magnitude of the energy difference between $SrCoO_{2.5}$ and $SrCoO_{3-\delta}$ is smaller, in particular at low temperatures, than that of SMO at a given oxygen content. The energy difference between brownmillerite $SrCoO_{2.5}$ and $SrCoO_{3-\delta}$ decreases drastically, by at least about 30%, with a small deviation (e.g., $\delta=0.1$) from perfect stoichiometry, while the maximum change in SMO is only about 20% at the same oxygen content. The reduced energy barrier for the phase transition between $SrCoO_{2.5}$ and $SrCoO_{3-\delta}$ with a small deviation from the stoichiometric $SrCoO_3$ at low temperatures may be readily manipulated with non-thermodynamic factors, e.g., kinetics, induced strain, and surface-to-volume ratio. However, the energy difference between the $SrMnO_{2.5}$ and $SrMnO_{3-\delta}$ phases remained large regardless of the change in oxygen stoichiometry and temperature. These thermodynamic considerations provide considerable advantages of the strontium cobaltite over other conventional perovskites for rapid topotactic phase control. As can be observed in FIG. 8, the formation of $SrCoO_{2.5}$ is more energetically favorable than $SrCoO_{3-\delta}$, whereas formation of $SrMnO_{3-\delta}$ is more favorable than $SrMnO_{2.5}$. Interestingly, the Gibbs free energy difference for highly oxygenated $SrCoO_{3-\delta}$ ($\delta<0.3$) increases as the temperature increases, while the opposite relationship exists for SMO. This observation of the thermodynamic phase stability of strontium cobaltite provides crucial information needed for understanding the topotactic processes in multivalent cobaltites.

Thermodynamic descriptions for $SrCoO_{2.5}$ and $SrCoO_{3-\delta}$ were taken from the thermodynamic modeling of strontium cobaltite for which model parameters were critically and self-consistently evaluated to reproduce both phase equilibrium and thermochemistry data in their bulk form. All the equilibrium phases in the thermodynamic modeling of strontium cobaltite other than $SrCoO_{2.5}$ and $SrCoO_{3-\delta}$ were suspended in the thermodynamic calculation to compute only the energy difference between $SrCoO_{2.5}$ and $SrCoO_{3-\delta}$. Thermo-Calc software was used to minimize the individual Gibbs energies of the strontium cobaltite phases at given temperatures and oxygen contents. Thermodynamic descriptions for $SrCoO_{2.5}$ and $SrCoO_{3-\delta}$ were obtained from the 2010 Ph.D. thesis of J.E. Saal at the University of Pennsylvania. $SrCoO_{2.5}$ and $SrMnO_{2.5}$ were modeled as stoichiometric, while the perovskite phases were modeled as solution phases. The latter's designated oxygen sub-lattices allowed for mixing between oxygen and vacancy to achieve hypo-stoichiometry.

Figure 9A:
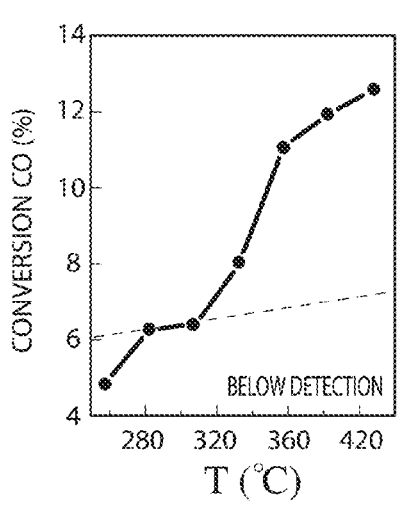
FIG. 9A is a graphical representation of catalytic activity of brownmillerite strontium cobaltite as carbon monoxide consumption.
Figure 9B:
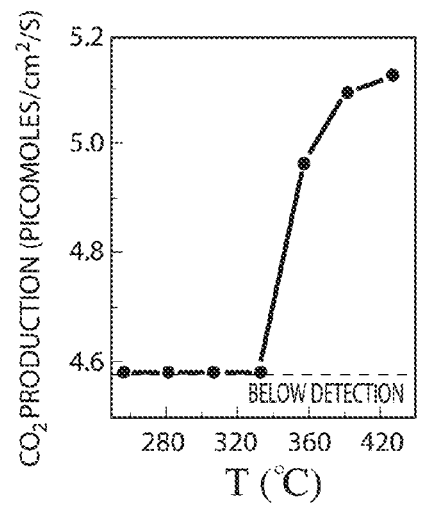
FIG. 9B is a graphical representation of the catalytic activity as carbon dioxide production.

Fast, reversible redox activity is useful to provide catalytic activity at relatively low temperatures. Carbon monoxide oxidation probe reactions were conducted to elucidate the use of strontium cobaltite as a heterogeneous catalyst. Due to the extremely small surface areas of the epitaxial films, a custom designed micro-reactor was used with inlet gas streams of CO (0.1 mbar) and $O_2$ (0.1 mbar). The effluent gas mixture was analyzed in-line with a gas-chromatograph and mass spectroscopy detector. For this reaction, the oxygen activity in the reactor was low; thus the epitaxial $SrCoO_{3-\delta}$ film was unstable and the epitaxial $SrCoO_{2.5}$ film on LSAT was chosen for the catalytic study. Catalytic activity can be connected to both the consumption of CO and the production of $CO_2$. The conversion of the inlet CO gas is shown in FIG. 9A. As compared with the clean reactor, where there was no sample, clear conversion of CO was observed above about 320° C., increasing at a significant rate. At the same temperatures, an uptake in $CO_2$ production was observed as shown in FIG. 9B. Because substantial activity can be measured at relatively low temperatures (above ~320° C.) from a sample with a surface area of approximately 0.5 $cm^2$, stabilized $SrCoO_{2.5}$ is a good catalyst for many other redox reactions.

Gas-phase catalysis measurements were made with a custom micro-reactor with a volume <50 mL. A high level of reactor cleanliness was achieved by limiting material within the reactor to fused quartz, stainless steel and fluoropolymer seals. Heating was conducted by passing light from a halogen bulb through a fused quartz platform to the backside of the sample. The inlet gas streams consisted of 300 ppm CO and 300 ppm $O_2$, both mixed with a helium balance (resulting in a partial pressure of 0.1 mbar for each gas), and a throughput of 5 SCCM. The temperature was programmed at 30° C. intervals each held for 16 minutes. At each interval the initial 10 minutes were reserved to allow the system to reach steady state conditions. Afterwards, a 20 μl aliquot of the gas stream was injected into the gas chromatograph / mass spectrometer (PERKINS ELMER®). A carbon packed capillary column was used to separate the CO and residual $N_2$ in the gas sample. The total ion chromatogram was mass separated to isolate peaks from CO and $CO_2$ and then integrated. The concentration was determined with the integrated values and calibrated values from known gas mixtures. Detection limits for the CO conversion were set by the surfaces within the reactor, as determined by running the temperature program without a sample loaded and measuring the CO levels. In contrast, the detection limit for $CO_2$ was set by the sensitivity of the mass spectrometer (~4ppb). The reproducibility of the conversion trends was substantiated with measurement of an additional $SrCoO_{2.5}$ epitaxial thin film.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A catalyst comprising epitaxially stabilized strontium cobaltite having a first oxidation state that reversibly transitions to a second oxidation state at a temperature of between about 200° C. and about 340° C., wherein:

one of said first and second oxidation states is defined as SrCoO$_{3-\delta}$;

$\delta$ is less than or equal to 0.1;

and the other of said first and second oxidation states is defined as SrCoO$_{2.5}$, wherein the strontium cobaltite is stabilized on a substrate selected from the group consistin of: perovskite (ABO$_3$), SrTiO$_3$, and (LaAlO$_3$)$_{0.3}$—(Sr$_2$AlTaO$_6$)$_{0.7}$; and wherein A is selected from the group consisting of an alkaline metal and an alkaline earth element, and B is a transitional metal.

2. The catalyst of claim 1, wherein the catalyst in said first oxidation state is ferromagnetic and electro-conductive and the catalyst in said second oxidation state is antiferromagnetic and electro-insulating.

3. The catalyst of claim 1, wherein said transition from said first oxidation state to said second oxidation state occurs in less than about 1 minute.

4. The catalyst of claim 1, wherein said transition from said first oxidation state to said second oxidation state occurs at a temperature of between about 210° C. and about 320° C.

5. The catalyst of claim 1, wherein said transition from said first oxidation state to said second oxidation state is rapidly reversible at a temperature greater than or equal to 200° C.

6. The catalyst of claim 1, wherein said transition from said first oxidation state to said second oxidation state is a reduction process, said first oxidation state is strontium cobaltite in a perovskite phase, and said second oxidation state is strontium cobaltite in a brownmillerite phase.

7. The catalyst of claim 6, wherein said reduction process is completed in less than about 1 minute and at a temperature of between about 210° C. and about 320° C.

8. The catalyst of claim 6, wherein said transition from said first oxidation state to said second oxidation state is a reversible process, said reversible process is an oxidation process, and said brownmillerite phase of said strontium cobaltite is oxidized to said perovskite phase of said strontium cobaltite.

9. The catalyst of claim 8, wherein said oxidation process is completed in less than about 1 minute and at a temperature of between about 210° C. and about 320° C.

10. The catalyst of claim 8, wherein said perovskite phase of said strontium cobaltite is SrCoO$_{3-\delta}$.

11. An article comprising a thin film having the catalyst of claim 1.

12. The article of claim 11, wherein the article is an electromechanical device.

13. The article of claim 12, wherein said electromechanical device is selected from the group consisting of: a fuel cell, an electrolyzer, a battery, a sensor, and a catalytic converter.

14. An epitaxially stabilized thin film of strontium cobaltite having a first oxidation state that reversibly transitions to a second oxidation state at a temperature of between about 200° C. and about 340° C., wherein:

one of said first and second oxidation states is defined as SrCoO$_{3-\delta}$;

$\delta$ is less than or equal to 0.1;

and the other of said first and second oxidation states is defined as SrCoO$_{2.5}$, wherein the strontium cobaltite is stabilized on a substrate selected from the group consisting of: pervoskite (ABO$_3$), SrTiO$_3$, and (LaAlO$_3$)$_{0.3}$—(Sr$_2$AlTaO$_6$)$_{0.7}$; and wherein A is selected from the group consisting of an alkaline metal and an alkaline earth element, and B is a transitional metal.

15. A method of transitioning the catalyst of claim 1 comprising epitaxially stabilized strontium cobaltite between a first oxidation state and a second oxidation state, the method comprising the steps of:

providing a substrate supporting at least a thin layer of said catalyst in said first oxidation state;

elevating a temperature of said catalyst in said first oxidation state; and providing a vacuum atmosphere to said catalyst in said first oxidation state;

wherein the temperature is elevated to within a range of about 210° C. to about 320° C. for a period of time to effect transition of said catalyst from said first oxidation state to said second oxidation state.

16. The method of claim 15, wherein the period of time is less than about 1 minute.

17. The method of claim 15, wherein said catalyst in said first oxidation state is in a perovskite phase and said catalyst in said second oxidation state is in a brownmillerite phase.

18. The method of claim 15, wherein the period of time is further defined as a first period of time and further comprising the steps of:

elevating a temperature of said catalyst in said second oxidation state; and providing oxygen to said catalyst in said second oxidation state for a second period of time;

wherein the second period of time is sufficient to effect transition of said catalyst from said second oxidation state back to said first oxidation state.

* * * * *